APPARATUS FOR SORTING ARTICLES

Original Filed March 13, 1959 6 Sheets-Sheet 1

INVENTOR
PAUL E. SEABORN

BY Hans G. Hoffmeister
ATTORNEY

APPARATUS FOR SORTING ARTICLES

Original Filed March 13, 1959 6 Sheets-Sheet 2

INVENTOR
PAUL E. SEABORN

BY Hans G. Hoffmeister
ATTORNEY

APPARATUS FOR SORTING ARTICLES

Original Filed March 13, 1959 6 Sheets-Sheet 3

INVENTOR
PAUL E. SEABORN

BY Hans G. Hoffmeister
ATTORNEY

APPARATUS FOR SORTING ARTICLES
Original Filed March 13, 1959 6 Sheets-Sheet 4
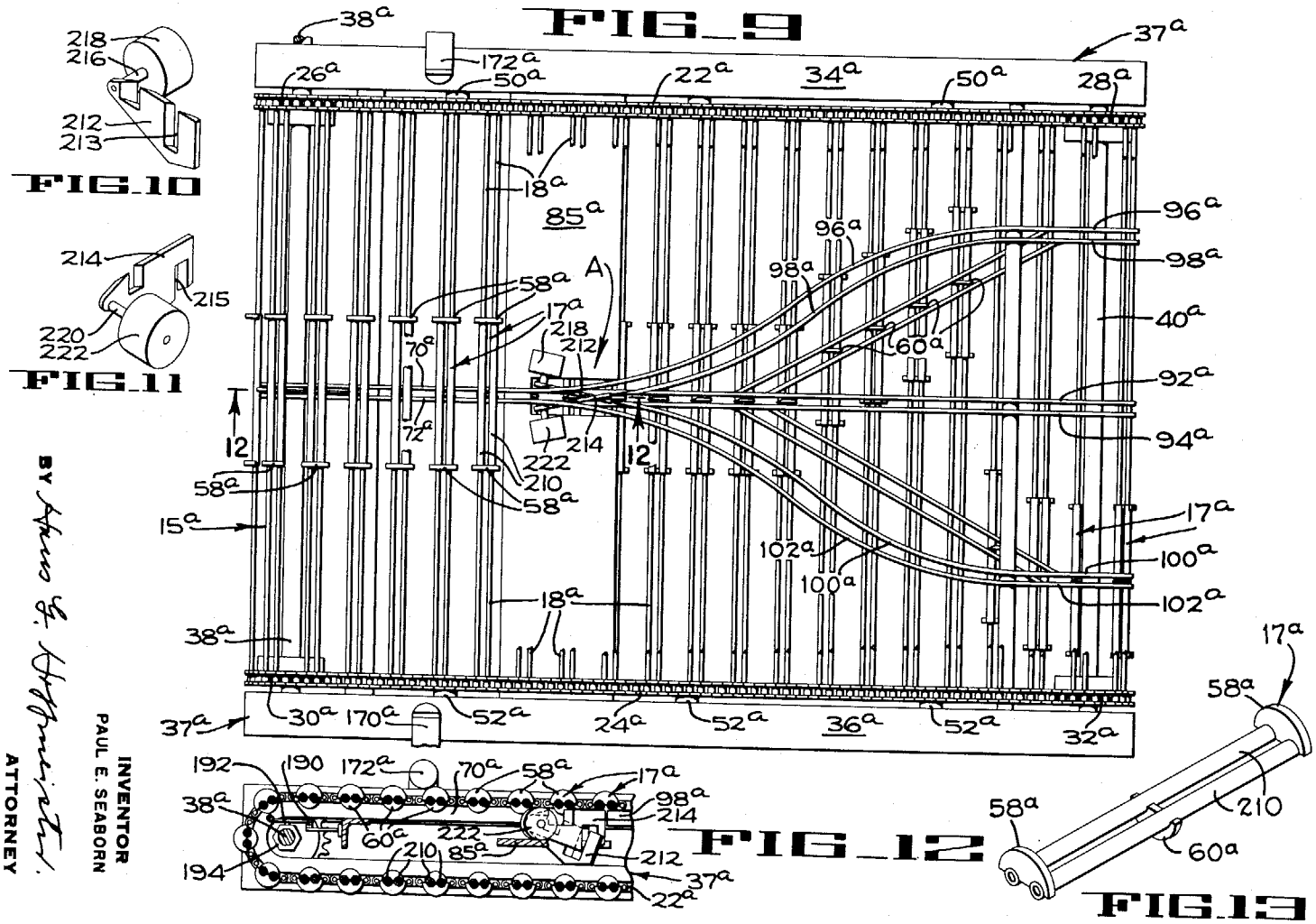
INVENTOR
PAUL E. SEABORN
BY Hans G. Hoffmeister
ATTORNEY

APPARATUS FOR SORTING ARTICLES

Original Filed March 13, 1959 6 Sheets-Sheet 5

INVENTOR
PAUL E. SEABORN

BY Hans G. Hoffmeister
ATTORNEY

Feb. 23, 1965 P. E. SEABORN Re. 25,732
APPARATUS FOR SORTING ARTICLES
Original Filed March 13, 1959 6 Sheets-Sheet 6
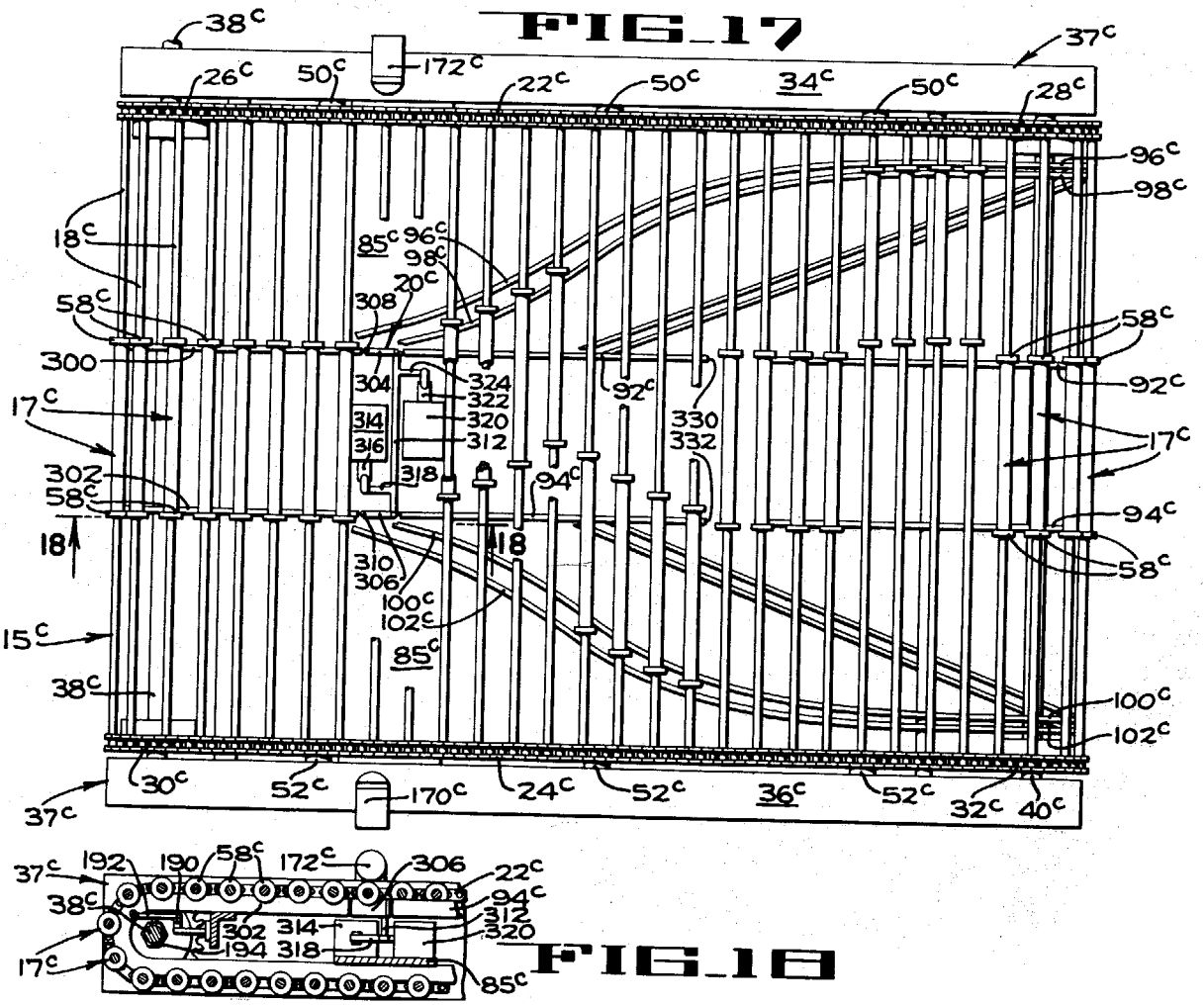
INVENTOR
PAUL E. SEABORN
BY Hans G. Hoffmeister
ATTORNEY United States Patent Office Re. 25,732
Reissued Feb. 23, 1965

25,732

APPARATUS FOR SORTING ARTICLES

Paul E. Seaborn, Campbell, Calif., assignor to FMC Corporation, San Jose, Calif., a corporation of Delaware Original No. 3,009,572, dated Nov. 21, 1961, Ser. No. 799,156, Mar. 13, 1959. Application for reissue Jan. 22, 1962, Ser. No. 168,870
12 Claims. (Cl. 209—121)

Matter enclosed in heavy brackets [ ] appears in the original patent but forms no part of this reissue specification; matter printed in italics indicates the additions made by reissue.

The present invention pertains to apparatus for sorting articles. More particularly, the invention relates to a mechanism for segregating or sorting articles according to weight classifications and rejecting from a stream of articles those articles which are over or under the limits of a predetermined weight range. The sorting system of the present invention finds particular utility when used with a check weighing apparatus attached to an automatic carton filling machine.

An object of the present invention is to provide an improved sorting apparatus.

Another object is to provide a sorting apparatus which may be rapidly conditioned to effect sorting of articles according to certain predetermined characteristics thereof, such as weight, size, or other physical properties of the articles.

Another object of the invention is to provide a sorting apparatus which provides a gradual transition of the rejected articles from the main stream of moving articles and thus permits high speed sorting.

Another object is to provide an improved switching mechanism for a sorting machine.

Another object is to provide an efficient conveyor for an article sorting machine.

Another object is to provide an improved guide track for a sorting machine.

These and other objects and advantages of the present invention will become apparent from the following description and the accompanying drawings, wherein:

FIG. 9 is a fragmentary plan view of a second embodiment of the sorting apparatus of the present invention with portions to the right of supporting plate 85(a) being broken away.

FIGS. 10 and 11 are perspectives of the gate members used in the sorting apparatus of FIG. 9.

FIG. 12 is a vertical section taken on line 12—12 of FIG. 9.

FIG. 13 is a perspective of the carrier used in the sorting apparatus of FIG. 9.

FIG. 17 is a plan view of another embodiment of the sorting apparatus of the present invention with portions to the right of supporting plate 85(c) being broken away.

FIG. 18 is a section taken on line 18—18 of FIG. 17.

Figures 1, 2, 3:
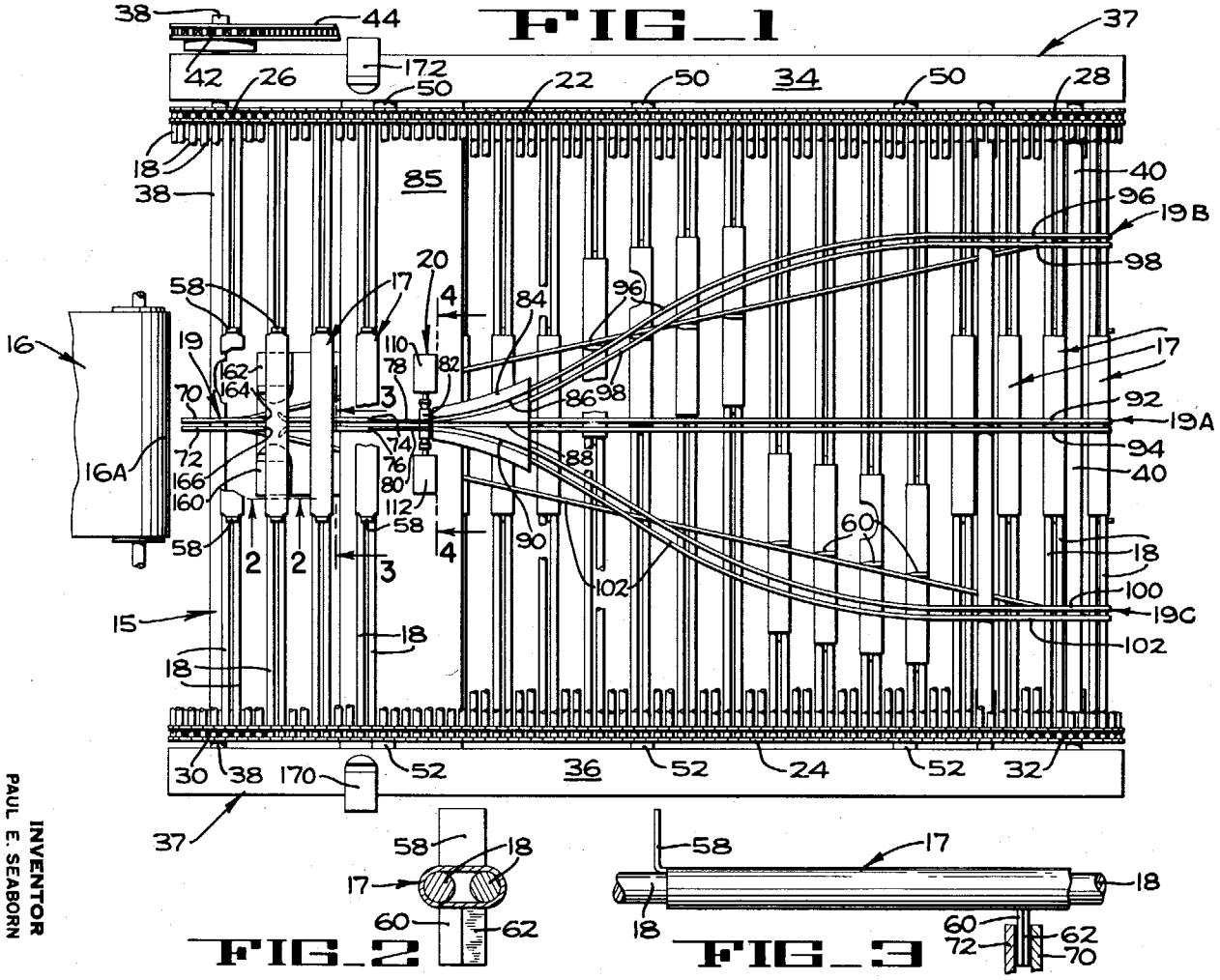
FIG. 1 is a plan view of a sorting mechanism constructed in accordance with the principles of the present invention, certain portions thereof being broken away to the right of support plate 85 to reveal apparatus in the lower portion of the mechanism.
FIG. 2 is an enlarged vertical section taken on line 2—2 of FIG. 1 illustrating the structure of one of the article carriers used in the sorting mechanism.
FIG. 3 is an enlarged section taken on line 3—3 of FIG. 1 and partially illustrating the construction of one of the carriers.

Referring now to the drawings, and particularly to FIG. 1 thereof, the reject or segregating mechanism of the present invention comprises a conveyor 15 adapted to be located with its pick-up end at the left, as viewed in FIG. 1, adjacent the delivery portion 16A of a check weighing mechanism 16. While on the conveyor, the articles to be sorted according to weight classifications are supported on the upper surfaces of carriers 17 that are mounted on transverse rods 18 of the conveyor for movement with the rods in a direction from left to right as seen in FIG. 1. The carriers 17 are also slidable on the rods 18 so that they can be shifted transversely of the conveyor. As the carriers are moved in a circuitous path by the rods 18 they are held in a desired position on the rods transversely of the conveyor by a guide track 19 which is supported on suitable frame members (not shown) of the machine immediately below carriers 17. The guide track 19 comprises a straight ahead section 19A, a left side section 19B and a right side section 19C. A switching device 20, which is responsive to a signal received from the above-mentioned check-weighing mechanism, directs each carrier selectively into one of the three track sections, each of which may be arranged to deliver the articles to a separate take-away conveyor (not shown). The conveyor 15 comprises a pair of endless chains 22 and 24 arranged in parallel spaced relation with respect to each other. The endless chain 22 is trained around suitable sprockets 26 and 28. Similarly, the chain 24 is trained around suitable sprockets 30 and 32. The sprockets 26 and 30 are fixed to a suitable shaft 38 which extends between and is rotatably supported in side members 34 and 36 of a support frame 37. Similarly, the sprockets 28 and 32 are fixed to a shaft 40 which extends between and is rotatably mounted in the side members 34 and 36. A drive sprocket 42 is fixed to the shaft 38 and is connected by a chain 44 to a suitable source of power (not shown). It will be understood that the conveyor 15 will be driven by the chain 44 in timed relation with the check-weighing mechanism 16 with which it is associated. A suitable chain guide (not shown), in the form of a vertical plate having a horizontal upper edge on which the upper reach of the chain 22 rests, is supported by a plurality of brackets 50 fixed to the side member 34. A similar chain guide (not shown) is provided for the chain 24 and is supported by brackets 52 fixed to the side member 36. The two chain guides are provided to prevent any sag in the upper reaches of the chains 22 and 24, respectively. Similar chain guides may be provided to maintain the lower reaches of the chains at a desired level.

The rods 18 of the conveyor 15 extend transversely between the chains 22 and 24 and are fixed thereto for movement therewith. As best seen in FIG. 2, each of the article carriers 17 is in the form of a flattened hollow tube which embraces two adjacent rods 18. An upstanding vertical flange 58 (FIG. 3) is provided at each end of the article carrier 17 to prevent articles resting thereon from sliding laterally off the carrier. It will be noted that the article carriers 17 are approximately one-third as wide as the conveyor 15. A blade 60 is fixed to the central portion of the article carrier 17 and projects downwardly therefrom for engagement with the guide track 19 as will be explained hereinbelow. The forward portion of the blade 60 is beveled inwardly from each side surface to form a forwardly facing knife edge 62. The article carriers are spaced apart longitudinally of the conveyor 15 a distance such that there are two rods 18, that do not have carriers thereon, between each pair of adjacent carriers 17. These unoccupied rods 18 are not necessary to the operation of the device and are provided only to fill the spaces between adjacent carriers to prevent an operator from accidentally catching his fingers in the mechanism. Hence, these unoccupied rods 18 have been broken off in FIG. 1 to clarify the illustration. All of the rods 18 on the upper reach of the conveyor 15 have been broken off, and the carriers 17 omitted, from a point adjacent the switching mechanism 20 to the delivery end of the conveyor 15, to reveal the structure of the track guide 19 therebeneath.

The guide track 19 includes a pair of guide rails 70 and 72 mounted immediately beneath the upper reach of the conveyor 15 adjacent the pick-up end thereof, and the downwardly projecting blades 60 on the carriers 17 are slidably received between the guide rails to maintain the carriers 17 in the central portion of the conveyor 15. The guide rails 70 and 72 terminate at the points designated 74 and 76. A pair of flexible guide members or gates 78 and 80 are fixed to the forward ends of the guide rails 70 and 72 and project forwardly therefrom. The forwardmost ends of the members 78 and 80 are connected to a throw bar 82 of the switching mechanism 20 described hereinbelow.

Immediately adjacent the free ends of the members 78 and 80, and extending therefrom toward the discharge end of the conveyor 15, there is provided a horizontal switching plate 84 that is part of the guide track 19 and is supported by a suitable plate 85 which extends between and is fixed to the side frame members 34 and 36. Three grooves 86, 88 and 90 are formed in the upper surface of the plate 84. The central groove 88 in the upper surface of the plate 84 is straight, the upper groove 86, as viewed in FIG. 1, curves upwardly away from the central groove 88 and the lower groove curves downwardly from the central groove 88. A pair of guide rails 92 and 94 of guide track section 19A abut the forward edge of the plate 84 so that their inner surfaces are coplanar with the side surfaces of the groove 88. The rails 92 and 94 extend in a straight line centrally of the conveyor 20 to a point adjacent the delivery end of said conveyor. A pair of guide rails 96 and 98 of guide track section 19B abut the forward end of the plate 84 with their inner surfaces coplanar with the side surfaces of the groove 86. The guide rails 96 and 98 curve outward toward the top of the conveyor, as viewed in FIG. 1, or toward the left side of the conveyor 15 when viewed looking in the direction of travel of the articles being conveyed thereon. The guide rails 96 and 98 are curved around the delivery end of the conveyor 15 concentric with the shaft 40. The inner rail 98 terminates adjacent the shaft 40 while the outer rail 96 continues back above the lower run of the conveyor toward and around the shaft 38 at the pick-up end of the conveyor 15 and blends with the previously described guide rail 70 to guide the carriers 17, which have been deflected to the left in a manner described hereinbelow, back to the central portion of the conveyor 15 in position to pickup another article. A pair of guide rails 100 and 102 of guide track section 19C abut the forward end of the plate 84 with their inner surfaces coplanar with the side surfaces of the groove 90. The guide rails 100 and 102 are similar to the guide rails 96 and 98 described above with the exception that the rails 100 and 102 are curved outwardly toward the right side of the conveyor 20 as viewed by a person looking in the direction of travel of said conveyor. The outer rail 102 returns diagonally inwardly adjacent the bottom reach of the conveyor 20 and blends with the previously described guide rail 72.

Figure 4:
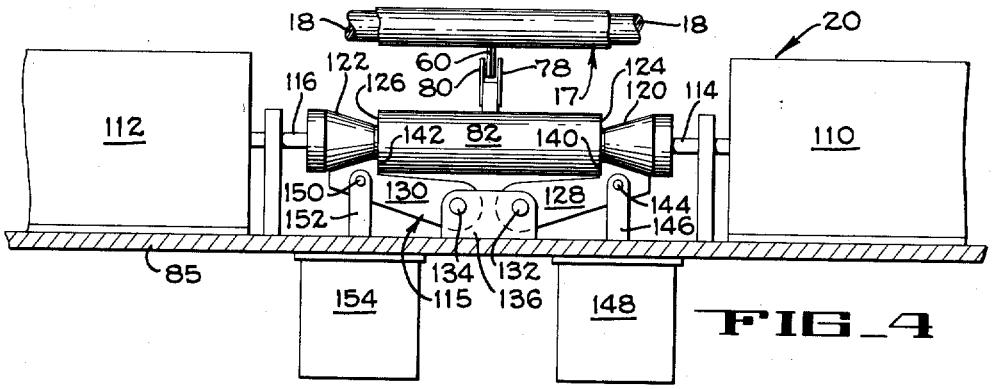
FIG. 4 is an enlarged section taken on line 4—4 of FIG. 1 and illustrating the centering latch for the switching mechanism.

The blades 60 on article carriers 17 are selectively switched into the central groove 88, the left groove 86, or the right groove 90 in the plate 84 by the switching mechanism 20 which includes a pair of solenoids 110 and 112 actuated in response to signals generated by the check weighing apparatus 16. As best seen in FIG. 4, plungers 114 and 116 of the solenoids 110 and 112, respectively, are fixed to the opposite ends, respectively, of the previously mentioned throw bar 82. If neither of the solenoids 110 or 112 is energized, the throw bar 82 will be located in its central position and the carriers 17 will be guided so that the blades 60 thereon enter the central groove 88 in the switch plate 84. If the solenoid 110 is energized, the flexible guides 78 and 80 will be pulled to the left, or upwardly as viewed in FIG. 1, so that the blades 60 on the carriers 17 will be deflected into the left groove 86 in the plate 84. Similarly, if the solenoid 112 is energized, the flexible guide members 78 and 80 will be deflected to the right, or downwardly as viewed in FIG. 1, to deflect the blades 60 on the article carriers 17 onto the right hand grooves 90 in the plate 84.

In order to prevent hunting of the throw bar 82 when the solenoids 110 and 112 are de-energized, a centering latch mechanism 115 is provided. The centering latch mechanism 115 is best illustrated in FIG. 4 and comprises a pair of grooves 120 and 122 formed in the throw bar 82 to provide outwardly facing abutment surfaces 124 and 126, respectively. A pair of latch members 128 and 130 are pivotally mounted on pins 132 and 134, respectively, that are fixed to a bracket 136 mounted on the previously described support plate 85 which extends between and is supported by the side members 34 and 36. The latch 128 has a hooked end providing an inwardly facing abutment surface 140 adapted to engage the abutment surface 124 on the throw bar 82. Similarly, the latch member 130 is provided with a hooked end having an inwardly facing abutment surface 142 adapted to engage the outwardly facing abutment surface 126 on the throw bar 82. The latch member 128 is connected by a pivot pin 144 to the throw bar 146 of a solenoid 148 fixed to the plate 85. Similarly, the latch member 130 is connected by a pivot pin 150 to the throw bar 152 of a solenoid 154 fixed to the plate 85. The solenoids 110 and 148 are electrically connected in parallel so that both will be energized at the same time. Similarly, the solenoids 112 and 154 are connected in parallel so that both will be energized at the same time.

A timing mechanism is provided to prevent the actuation of the switch mechanism while one of the blades 60 disposed part way in one of the grooves in the switch plate 84 and part way in the flexible gates 78 and 80, since actuation of the switching mechanism at this time will jam the switch. This timing mechanism comprises a relay switch 159 (FIGS. 5 and 6) controlled by a photo electric cell 160 (FIGS. 1, 5 and 6), mounted adjacent the path of travel of the blades 60 adjacent the pick-up end of the conveyor 15, and an opposed light source 162. The guide rails 70 and 72 are provided with aligned openings 164 and 166 therein to permit the beam to travel from the light source 162 to the photo cell 160 except when interrupted by the passage of one of the blades 60 therethrough. As will be explained in detail presently, the control circuit in which the relay switch 159 and the switching mechanism is connected is so arranged that the switching mechanism can be actuated only when the beam to the photo cell 160 is broken. Accordingly, the photo cell 160 is so located that the blade 60 of one of the carriers 17 moves out of beam-intercepting position just as a blade 60 of a preceding carrier 17 begins to move from the gates to the switch plate 84. With this arrangement, the beam will be unbroken and the control circuit de-energized until the carrier has moved out of contact with the gate. A second photo cell 170 is mounted on the side member 36 in opposed relation to a light source 172 mounted on the side member 34 and controls a relay switch 169 in series with the relay switch 159. The photo cell 170 and the light source 172 are mounted at such an elevation above the conveyor 15 that the beam therebetween will be broken by an article resting on the article carriers 17. Again, the control circuit is such that the switching mechanism can be actuated only when the beam to the photo cell 170 is broken. Thus, it becomes apparent that the switching mechanism can be actuated only when the beams to both the photo cells 160 and 170 are broken simultaneously.

Figure 5:
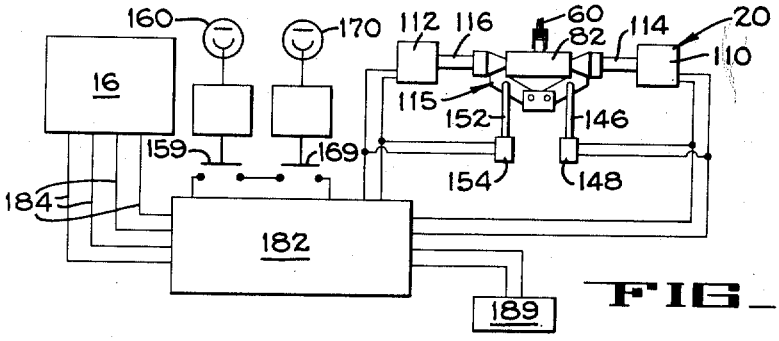
FIG. 5 is a schematic illustration of the control circuits for the sorting mechanism illustrated in FIG. 1.

Referring now to the schematic wiring diagram illustrated in FIG. 5, it will be seen that, if an article weighed by the check weighing mechanism 16 is within a prescribed weight range, the check weighing mechanism transmits a signal to a memory unit 182 through suitable electrical circuits indicated by the electrical connections 184, and preconditions circuits within the memory unit 182 so that neither of the solenoids 110 or 112 will be energized and the switch mechanism will not be actuated when the memory unit 182 is triggered by the breaking of the beams to the photo cells 160 and 170. Therefore, carriers 17, supporting articles that have a weight within the prescribed range, are not diverted to the right or left but are conveyed along the central portion of the conveyor. If the article weighed by the check weighing mechanism 16 is underweight, this information or intelligence is transmitted to the memory unit 182 over the connections 184 and conditions circuits therein so that, when the unit 182 is triggered to deliver this intelligence, the solenoid 110 will be energized to condition the switching mechanism so that the carriers supporting the underweight article will be deflected to the left side of the conveyor as viewed by a person looking in the direction of travel of the conveyor 15. Similarly, if the article is overweight as determined by the check weighing mechanism 16, a suitable signal is transmitted by the connections 184 to the memory unit 182 to precondition the circuits therein so that, when the unit 182 is triggered to deliver the intelligence stored therein, the solenoid 112 will be energized to actuate the switching mechanism to deflect the article carriers, on which the heavy article is resting, toward the right side of the conveyor 15 as viewed by a person looking in the direction of travel thereof.

A timer mechanism 189 is associated with the memory unit 182 so that, after the unit 182 has been triggered to energize either the solenoid 110 or the solenoid 112, the solenoid so energized will remain energized until all of the carriers upon which any one article is resting have passed the switching assembly. The timer 189 then deenergizes whichever solenoid had been energized and reconditions the memory unit 182 to receive the data associated with the next succeeding article.

The electrical circuits associated with the switching mechanism 20 are disclosed schematically in FIG. 5. A showing of a representative electrical control for the switching mechanism 20 is illustrated in somewhat more detail in FIG. 6. The circuits illustrated are illustrative only and it will be recognized that many other circuits could be used to perform the same functions.

The check weigher 16 has incorporated therein a weight classifier which is adapted to close one circuit if the package is underweight and another if the package is overweight. If the package is underweight, a circuit is closed from the power line $L_1$, through lead 350, lead 352, coil 354C of a relay 354, leads 356, 358, contacts 360 of the timer unit 189, leads 364 and 366 to power line $L_2$. This circuit energizes the normally open relay 354 to close the contacts 354A and 354B. A holding circuit for the relay 354 comprises $L_1$, leads 370, 372, 374, contacts 354A, lead 376, coil 354C, leads 356, 358, timer contacts 360, leads 364 and 366 to line $L_2$. This holding circuit retains the relay 354 energized after the original energizing circuit is broken. The energizing of the relay 354 preconditions a circuit to energize the switch actuating solenoid 112 upon the energizing of a relay 380. The relay 380 is energized through a circuit including the photo cell controlled relay switches 159 and 169, previously described, which circuit is closed as follows: From line $L_1$, through lead 382, relay switch 159, lead 384, relay switch 169, lead 386, the coil 380C of relay 380, lead 388, timer contacts 360, leads 364 and 366 to line $L_2$. When the relay 380 is energized by the simultaneous closing of both the relay switches 159 and 169, the relay 380 will remain energized through a holding circuit as follows: From line $L_1$ through lead 370, lead 390, contact 380A, lead 392, coil 380C, lead 388, timer contacts 360, and leads 364 and 366 to line $L_2$.

When relay 380 is energized, it completes the preconditioned circuit to the switch actuator solenoid 112 as follows: from line $L_1$, through leads 370, 390, relay contacts 380B, leads 394 and 396, relay contacts 354B, leads 398 and 400, solenoid 112 and leads 402, 404, 406, 408 and 410 to line $L_2$. Energizing the relay 380 also closes the circuit to the timer motor 412 as follows: from line $L_1$ through leads 370, 390, contacts 380D, lead 414, motor 412, and leads 416 and 366 to line $L_2$. When the motor 412 has caused one revolution of a cam 418 connected thereto, the cam causes the points 360 to break momentarily to open the holding circuits to the relays 354 and 380 thus restoring the circuits to their neutral positions ready to be actuated in accordance with the characteristics of the succeeding package.

The mechanism controlling the triggering of the memory unit, or in other words, the energizing of the relay 380, comprises the two photo cell controlled relay switches 159 and 169. The relay switch 159 comprises the contacts of a normally closed relay 159R which is normally energized and held open by an amplifier 420 with which the photo cell 160 is associated. When the light beam to the cell 160 is broken, and the cell no longer conducts current, the output from the amplifier 420 drops so that the relay 159R is no longer energized and the switch 159 then closes. The relay switch 169 is part of a normally closed relay 169R held open by the output of an amplifier 422 with which the photo cell 170 is associated. The action of this system is the same as that of the switch 159, when the beam to the cell 170 is broken the relay 169R is deenergized and the switch 169 closes.

To summarize, if the package is underweight, the relay 354 is energized to precondition the circuit that controls solenoid 112. Then when both beams to the photo cells 160 and 170 are broken, the relay 380 will be energized and the preconditioned circuit is closed to energize the solenoid 112. Thus, the switch mechanism 20 will be actuated to shift the carriers and the underweight package thereon to the left side of the conveyor 15.

Returning again to the check weigher and classifier unit 16, if the package is overweight, the classifier closes a circuit comprising line $L_1$, lead 350, lead 430, coil 432C of a relay 432, leads 434, 358, timer contacts 360, leads 364 and 366, and line $L_2$. A holding circuit comprising $L_1$, leads 370, 372, 436, relay contacts 432A, lead 438, coil 432C, leads 434, 358, timer contacts 360, leads 364, 366, and $L_2$ holds the relay 432 energized until completion of the cycle of the timer 189. When the relay 432 closes it preconditions the energizing circuit for the switch actuating solenoid 110 as follows: from line $L_1$, through leads 370, 390, relay contact 380B, leads 394, 440, relay contact 432B, leads 442, 444, solenoid 110, and leads 446, 410 to line $L_2$. Then, when the relay 380 closes in response to the simultaneous breaking of the light beams to the photo cells 160 and 170, the preconditioned circuit is energized to energize solenoid 110 causing the package to be shifted to the right side of the conveyor 15.

If the package is determined to be of normal weight, that is within the prescribed weight range, neither of the circuits to the relays 354 or 432 will be energized, thus when the relay 380 is subsequently energized nothing happens at the switch mechanism 20 and the carriers 17, upon which the normal weight package rests, will proceed along the central portion of the conveyor 15.

Figure 7:
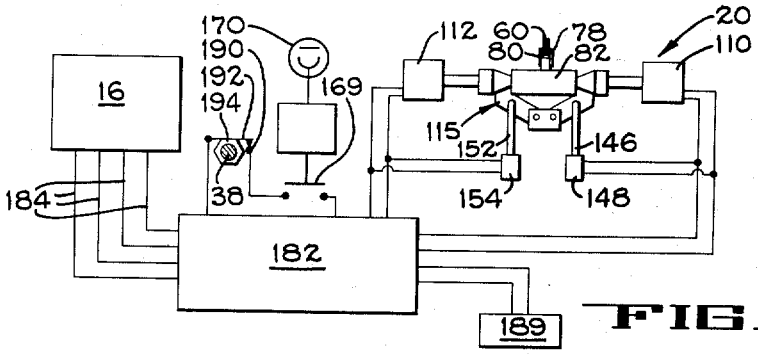
FIG. 7 is a schematic illustration of a modification of the control system shown in FIG. 5.
Figure 6:
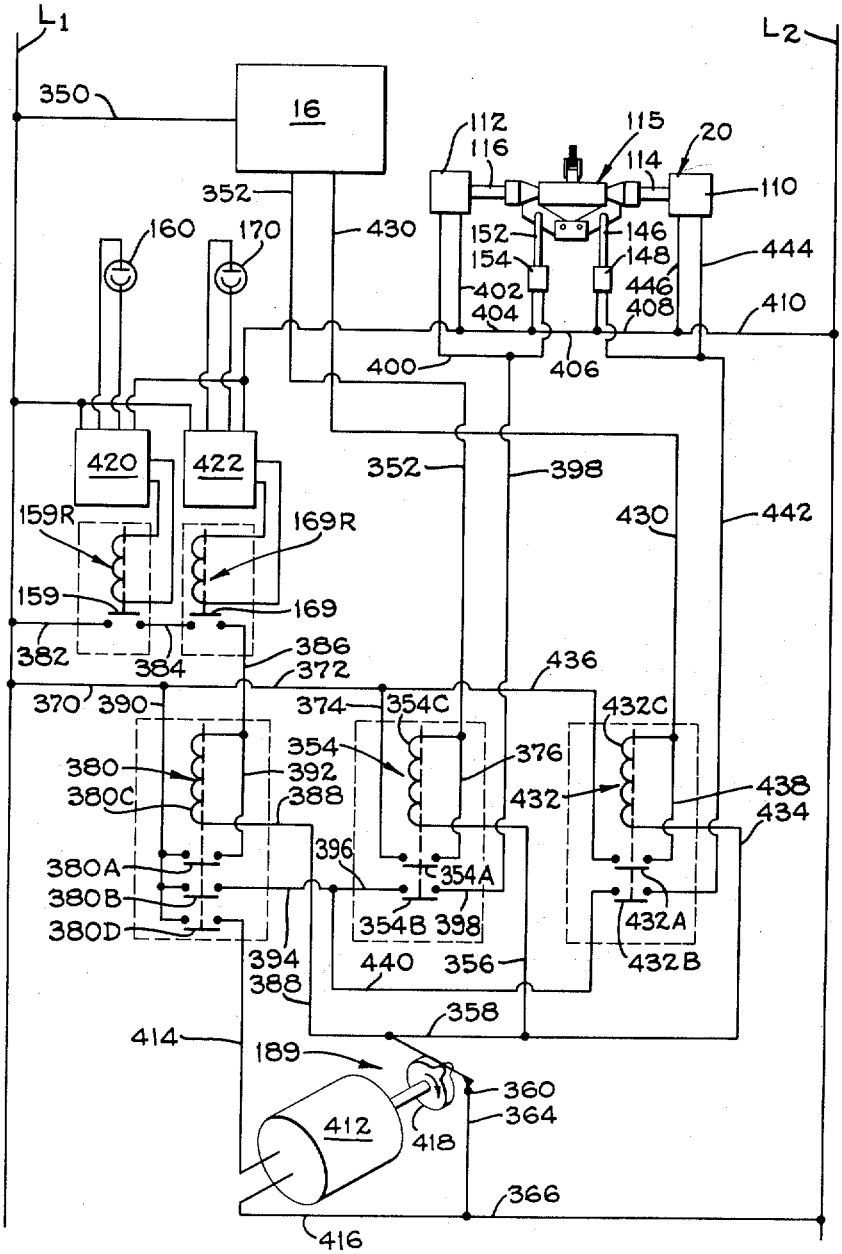
FIG. 6 is a more detailed diagram of the control circuits shown in FIG. 5.

The modified control circuit illustrated schematically in FIG. 7 is the same as that shown in FIGS. 5 and 6 and operates in exactly the same manner with the exception that the timing of the switch mechanism with the action of the blades 60 on the article carriers 17 is effected mechanically instead of by the photo-electric circuit including the photo cell 160 and the relay switch 159. In this circuit the photo cell 160 and switch 159 are replaced by a pair of breaker points 190, the movable point of which is mounted on a breaker arm 192 which contacts a many lobed cam 194 fixed to, or driven in timed relation with, the drive shaft 38 of the conveyor 15.

Figure 8:
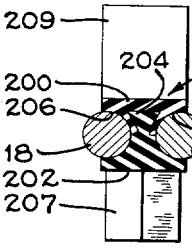
FIG. 8 is a section similar to that shown in FIG. 2 and illustrates a modified form of article carrier.

A carrier 199 illustrated in FIG. 8 is a modified form of the article carrier 17 illustrated in FIGS. 1, 2, 3, and comprises an upper portion 200 and a lower portion 202 connected together by a dove-tail joint 204. When so interconnected the member 199 is provided with two arcuate recesses 206 and 208 adapted to engage the side surfaces of two adjacent rods 18 of the conveyor 15 in sliding engagement therewith. A blade 207 extends downwardly from the central portion of the lower member 202 and two upwardly projecting flanges 209 extend upwardly from the lateral ends of the upper member 200 to retain the articles thereon. It can readily be seen that the article carrier 199 may be substituted for the article carrier 17 described hereinabove.

The embodiment of the invention illustrated in FIGS. 9 and 12 is essentially the same as that disclosed and described in conjunction with FIGS. 1, 2 and 3 and the parts which are the same or which perform the same function are therefore given the same reference numerals as used in conjunction with the description of the device of FIG. 1 with the letter "a" appended thereto. The carriers 17a used in the structure illustrated in FIGS. 9 and 12 are in the form of two parallel tubes 210 (FIG. 12) each slidably received on one of the rods 18a. The tubes 210 are connected together at their ends by upwardly projecting semi-circular flanges 58a. The guide blade for the carriers 17a is in the form of a downwardly projecting semi-circular flange 60a connected to the underside of the central portion of the tubes 210. It will be noted that the breaker arm mechanism for the alternate type control circuit illustrated in FIG. 7 is shown in connection with the structure illustrated in FIG. 12 wherein the cam 194 is fixedly mounted on the drive shaft 38a, and actuates the breaker arm 192 to effect the making and breaking of the breaker points 190 in the manner described hereinabove.

The switching mechanism for diverting the underweight articles to the left and the overweight articles to the right comprises guide rails 70a and 72a which diverge from each other in the switching zone designated A. The rail 70a is formed integral with a rail 96a of a track section comprising curved rails 96a and 98a, and the rail 72a is formed integral with the outermost guide rail of the track section made up of rails 100a and 102a. A deflecting gate 212 (FIGS. 9 and 10) is adapted to bridge from the inner surface of the guide rail 70a to the rearmost end of the guide rail 100a, and a similar deflecting gate 214 (FIG. 11) is adapted to bridge from the inner surface of the guide rail 72a to the rearmost end of the guide rail 98a. The gate 212 is provided with a vertical slot 213 extending downwardly from its upper surface and the gate 214 is provided with a vertical slot 215 extending upwardly from its lower surface so that two gates may cross each other. The gate 212 is fixed to the armature 216 of a rotary solenoid 218. Similarly, the gate 214 is fixed to the armature 220 of a rotary solenoid 222. The gates 212 and 214 are usually disposed in a downwardly rotated position out of the path of movement of the blades 60a on the carriers 17a. When the gates are in this lowered position, the carriers 17a will proceed in a straight line, and the blades 60a thereon will pass over the gates 212 and 214 and enter between the rear ends of guide rails 92a and 94a which direct the carriers down the central portion of the conveyor. If it is desired, in accordance with the data transmitted by the associated check weighing mechanism (not shown), to deflect an underweight article to the left, as viewed by a person looking in the direction of travel of the conveyor 15a, the solenoid 222 is energized to rotate the gate 214 upwardly into the path of the blades 60a on the carrier 17a so that said blades will be deflected by the gate 214 to the left and enter between the guide rails 96a and 98a. Similarly, if it is desired to deflect an overweight article to the right, the solenoid 218 will be energized to raise the gate 212 upwardly into the path of the blades 60a, so that the blades 60a will be deflected to the right and enter between the guide rails 100a and 102a.

It will be noted that either of the control circuits illustrated in FIGS. 5 or 7 could be used with this embodiment, with the solenoids 218 and 222 being substituted for the solenoids 112 and 110, respectively.

Figures 14, 15, 16:
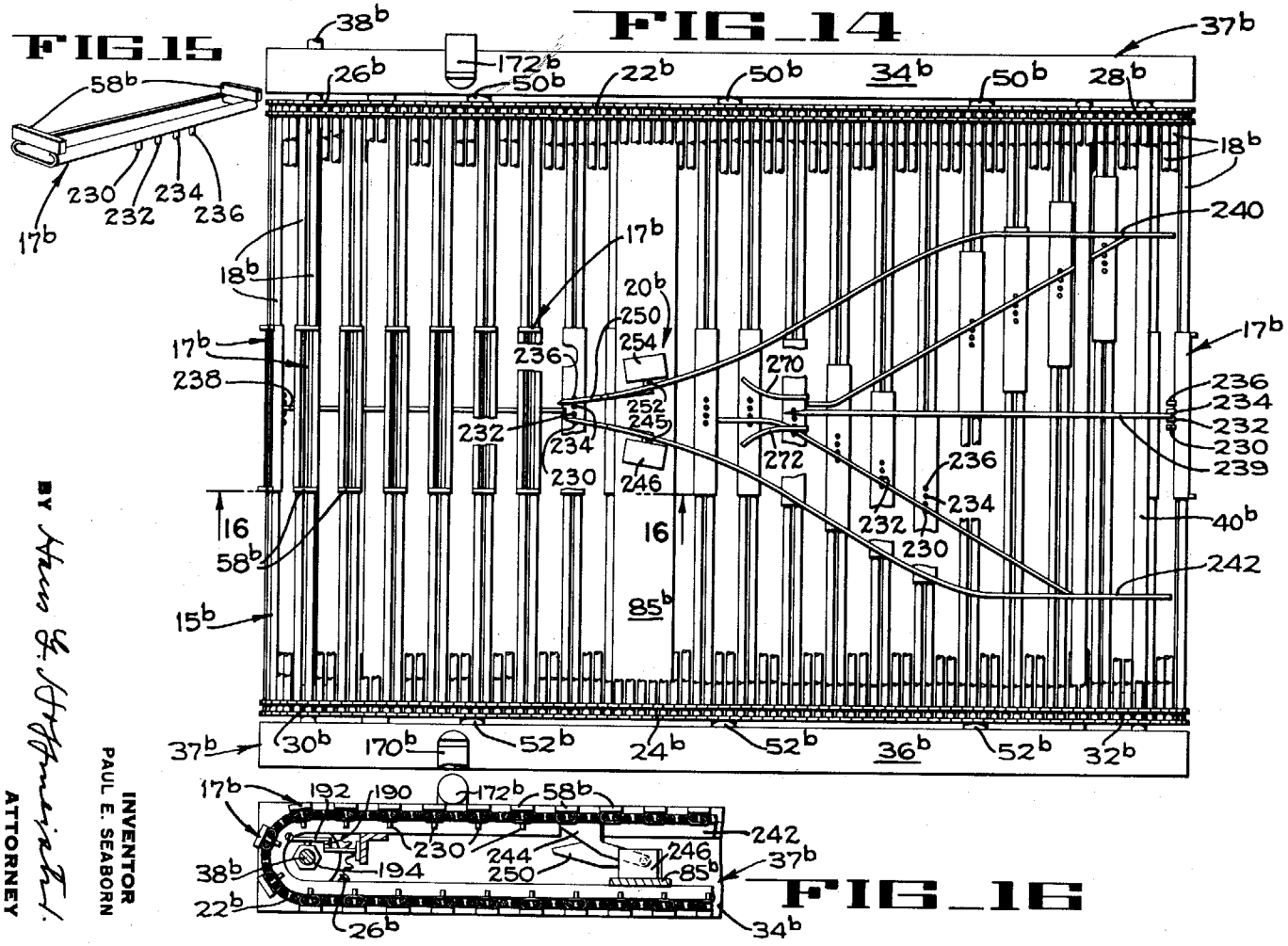
FIG. 14 is a fragmentary plan view of another embodiment of the sorting apparatus of the present invention with portions to the right of supporting plate 85(b) being broken away.
FIG. 15 is a perspective of the carrier used in the sorting apparatus of FIG. 14.
FIG. 16 is a section taken on line 16—16 of FIG. 14.

The embodiment illustrated in FIGS. 14 and 16 is essentially the same as that illustrated in FIG. 1 and the parts which are the same are therefore given the same reference numerals with the letter "b" appended thereto. In this embodiment however, the guide blades 60 on the carrier 17 have been replaced by four equally spaced cylindrical pins 230, 232, 234 and 236, which project downwardly from each carrier 17b. The pins are located adjacent the central portion of the carrier 17b and are symmetrically disposed two on either side of the transverse center thereof. At the left end (FIG. 14) of the conveyor 15b a single guide rail 238 is mounted in position to be slidably received between the two central pins 232 and 234 of each carrier. A switching mechanism 20b selectively guides each carrier 17b onto a center guide rail 239, a left side guide rail 240, or a right side guide rail 242. The switch mechanism 20b comprises a gate member 244 (FIG. 16) fixed to the armature 245 of a rotary solenoid 246, and a gate member 250, which is identical in configuration to gate 244 and is fixed to the armature 252 of a rotary solenoid 254. When the gates 244 and 250 are in their lowermost position the carriers 17b will progress in a straight line after leaving the terminal end of the guide rail 238 and will be adjusted for any slight misalignment by the gathering rails 270 and 272 adapted to engage the outer surfaces of the two outermost pins 230 and 236 and guide the carrier 17b so that the guide rail 239 enters between the two central pins 232 and 234. If the gate 250 is raised by the energizing of the solenoid 254 the gate 250 is received between the pins 234 and 236 and the carrier 17b is deflected to the left into guided relation with guide rail 240. Similarly, if the gate 244 is raised by energizing the solenoid 246 the gate 244 will enter between the pins 230 and 232 and deflect the carrier 17b to the right into guided relation with the guide rail 242 which abuts the forward end of the gate 244.

As seen in FIG. 14, the left and right side guide rails 240 and 242, respectively, have lower return runs that are slanted inwardly to bring the carriers 17b back to a central position where they are engaged by a lower run of the rail 238.

It will be noted that either of the control circuits shown in FIGS. 5 and 7 may be used to control the action of the embodiment just described, the solenoid 254 replacing the solenoid 110 and the solenoid 246 replacing the solenoid 112 illustrated in said control circuits.

In the embodiment illustrated in FIGS. 17 and 18, the structure shown therein is essentially the same as that illustrated in FIG. 1 and the elements thereof, which are the same, are given the same reference numerals as were used in connection with FIG. 1 with the letter "c" appended thereto. In the embodiment illustrated in FIGS. 17 and 18 the bars 18c are spaced from each other a distance greater than that illustrated in the preceding embodiment, and the carrier 17c which are in the form of tubes, are slidably mounted one on each of the bars 18c. Flanges 58c at the lateral ends of the tubes are circular and project both above and below the bars 18c and not only perform the function of retaining the articles on the carriers 17c but also perform the function of engaging the guide track which includes the guide rails 300 and 302 laterally spaced from each other disposed at the inlet end of the conveyor 15c and adapted to engage the inner surfaces of the flanges 58c. The left side guide rails 96c and 98c start from a position adjacent the guide rail 300, and the right side guide rails 100c and 102c start from a position adjacent the guide rail 302.

The switching mechanism 20c comprises a swinging gate member 304 normally disposed in the same plane with the guide rail 300 and the guide rail 92c, and a second swinging gate 306 normally in the same plane with the guide rails 302 and 94c. The swinging gates 304 and 306 have end portions pivotally mounted for swinging movement about vertical axes defined by pivot pins 308 and 310, respectively. The other ends of the gates 304 and 306 are connected together by a tie bar 312 so that they act in unison with each other. Movement of the gates 304 and 306 to the left is effected by a solenoid 314, the plunger 316 of which is connected to a bracket 318 fixed to the tie bar 312. Similarly, the movement of the gates 304 and 306 to the right is controlled by a solenoid 320, the plunger 322 of which is connected to a bracket 324 fixed to the tie bar 312. When the gates 304 and 306 are moved to the left, by energizing the solenoid 314, the left flange 58c on the carriers 17c is deflected by the gate 304 to the left to enter between the guide rails 96c and 98c. At the same time the opposite gate 306 is moved to the left to permit flange 58c on the right side of the carrier 17c to pass inside of the guide rail 94c. It will be noted that the guide rail 92c is provided with a gap at 330 to permit the flange 58c at the right side of each carrier 17c to pass through the guide rail 92c when the carrier is being guided to the left side of the conveyor by the guide rails 96c and 98c. A similar gap 332 is provided in the guide rail 94c to permit passage of the flange 58c at the left end of the carrier 17c through the rail 94c when the carriers 17c are deflected to the right by the guide rails 100c and 102c.

A latch mechanism similar to that illustrated in FIG. 4 could be employed in conjunction with the tie bar 312 to prevent hunting of the switching mechanism when the solenoids 314 and 320 are deenergized. The modification illustrated in FIGS. 17 and 18 may be actuated by either of the control circuits discussed above in connection with FIGS. 5 and 7.

In the operation of the invention described in any of the above modifications, the article to be sorted, usually a package having been filled by an automatic filling apparatus, passes over a check weighing unit 16 which determines the weight of the package or article as it passes thereover. If the weight of the package is within the limits of the weight range preset in the check weighing mechanism, the switching mechanism remains inactive and the package continues along the conveyor 15 on the central portion thereof and is delivered onto another conveyor (not shown) which carries it to a package closing and sealing mechanism or another processing station. If the package is underweight, the switching mechanism is so conditioned that all of the carriers on which the package rests are deflected to the left by the switching mechanism so that at the delivery end of the conveyor 15 the package carriers on which the underweight package rests will be adjacent the left side of the conveyor 15 and the package will be delivered onto a conveyor (not shown) which delivers the underweight package to an area wherein an operator may add material to the package to bring it within the prescribed weight limits. If the package is overweight, the switching mechanism will be so conditioned that all of the carriers upon which the package rests will be deflected to the right so that, when the package reaches the delivery end of the conveyor 15, the package will be adjacent the right side thereof and will be delivered onto a conveyor (not shown) and carried to a location wherein an operator can remove sufficient material to bring it within the prescribed weight limits.

From the foregoing description it may be seen that the several embodiments disclosed and described herein provide segregating or sorting mechanisms capable of high speed operation for separating articles into different classifications according to various characteristics of the articles as determined by a classification identifying mechanism.

While the preferred embodiments of the present invention have been shown and described herein it should be noted that various changes may be made therein without departing from the spirit of the invention as defined in the appended claims.

Having thus described my invention, what I claim as new and desire to protect by Letters Patent is:

1. In an article sorting mechanism, a conveyor having a pick-up zone, a switching zone and a delivery zone, a plurality of article carriers mounted on said conveyor for movement therewith and for lateral movement with respect thereto, a downwardly projecting blade on each of said carriers, a first pair of guide rails one on either side of said blade for maintaining said carriers centrally of said conveyor between said pick-up zone thereof and said switching zone, a second pair of guide rails for retaining said carriers centrally of said conveyor between said switching zone and said delivery zone, a third pair of guide rails between said switching zone and said delivery zone for guiding said carriers to the left side of said conveyor, a fourth pair of guide rails between said switching zone and said delivery zone for guiding said carriers to the right side of said conveyor, a switching mechanism at said switching zone for selectively engaging said blades with any one of said second, third, or fourth pair of guide rails, said switching mechanism comprising a pair of flexible swinging gates rigidly connected to the forward end of the first pair of guide rails for conjoint swinging movement, a throw bar connected to the forward ends of both of said gates and adapted to be moved laterally in either direction to selectively bring said forward ends of said gates into a planar relation with the rails of said second, third or fourth pairs of guide rails, and means for moving said throw bar laterally.

2. In an article segregating mechanism, a conveyor having a pick-up zone, a switching zone and a delivery zone, a plurality of article carriers mounted on said conveyor for lateral movement with respect thereto, four downwardly projecting equally spaced pins on each of said carriers, said pins being disposed in a line extending from left to right laterally of said conveyor, a first guide rail received between the two centermost pins for maintaining said carriers centrally of said conveyor between said pick-up zone and said switching zone, a second guide rail receivable between the two centermost pins for retaining said carriers centrally of said conveyor between said switching zone and said delivery zone, a third guide rail receivable between the extreme left hand pin and the pin next adjacent thereto between said switching zone and said delivery zone for guiding said carriers to the left side of said conveyor, a fourth guide rail receivable between the extreme right hand pin and the pin next adjacent thereto between said switching zone and said delivery zone for guiding said carriers to the right side of said conveyor, a switching mechanism at said switching zone for selectively engaging said pins with any one of said second, third, or fourth guide rails, said mechanism comprising a first gate mounted adjacent the terminal end of said first guide rail for movement from a position out of plane of movement of said pins to a position in said plane and in alignment with the space between said left hand pin and the pin next adjacent thereto and abutting the leading end of said third guide rail to positively guide said last mentioned pins onto said third guide rail, a second gate mounted adjacent the terminal end of said first guide rail for movement from a position out of the plane of movement of said pins to a position in said plane and in alignment with the space between said right hand pin and the pin next adjacent thereto and abutting the leading end of said fourth guide rail to positively guide said last mentioned pins onto said fourth guide rails and means for selectively moving said gates into the plane of movement of said pins.

3. In an article sorting mechanism, a conveyor having a pick-up zone, a switching zone and a delivery zone, a plurality of article carriers mounted on said conveyor for movement therewith and for movement laterally with respect thereto, a downwardly projecting semicircular blade on each of said carriers, a first pair of guide rails one on either side of said blade for maintaining said carriers centrally of said conveyor between said pick-up zone and said switching zone, a second pair of guide rails for retaining said carriers centrally of said conveyor between said switching zone and said delivery zone, a third pair of guide rails between said switching zone and said delivery zone for guiding said carriers to the left side of said conveyor, a fourth pair of guide rails between said switching zone and said delivery zone for guiding said carriers to the right side of said conveyor, a switching mechanism at said switching zone for selectively engaging said blades with any one of said second, third, and fourth pair of guide rails, said mechanism comprising a first gate rotatably mounted for movement about a horizontal axis from a position beneath the plane of said guide rails to a position bridging between the inner surface of the left rail of said first pair of guide rails and the innermost rail of said fourth pair of guide rails, a second gate rotatably mounted for movement about a horizontal axis from a position beneath the plane of said guide rails to a position bridging between the inner surface of the right rail of said first pair of guide rails and the innermost rail of said third pair of guide rails, and means for selectively raising either of said gates.

4. In an article segregating mechanism, a conveyor having a pick-up zone, a switching zone and a delivery zone, a plurality of tubular article carriers mounted on said conveyor for lateral movement with respect thereto, a downwardly projecting circular blade on the left end and right end of each of said carriers, a first pair of guide rails having one rail arranged to engage the inner surface of each of said left and right end blades for maintaining each carrier centrally of said conveyor between said pick-up zone and said switching zone, a second pair of guide rails arranged to engage both said left and right end blades of a carrier for retaining said carrier centrally of said conveyor between said switching zone and said delivery zone, a third pair of guide rails between said switching zone and said delivery zone adapted to receive therebetween the left end blade of a carrier for guiding said carrier to the left side of said conveyor, a fourth pair of guide rails between said switching zone and said delivery zone adapted to receive therebetween the right end blade of a carrier for guiding said carrier to the right side of said conveyor, a switching mechanism at said switching zone for selectively engaging certain of said blades with any one of said pairs of guide rails, said mechanism comprising a pair of swinging gates mounted between said first and second pair of guide rails, said gates when in their central position being coplanar with said first and second pairs of guide rails, means connecting said gates for conjoint swinging movement, and means for selectively swinging said gates to the left to guide the blades at the left ends of said carriers between the third pair of guide rails or for swinging said gates to the right to guide the blades at the right ends of said carriers between the fourth pair of guide rails.

5. In an article sorting mechanism, a conveyor; a plurality of article carriers mounted on said conveyor for lateral movement wtih respect thereto and each carrier having a downwardly directed blade; guide means for retaining said carriers centrally of said conveyor; guide means for guiding said carriers to the left side of said conveyor; guide means for guiding said carriers to the right side of said conveyor; a switch mechanism for selectively engaging said carriers with any one of said guide means; electrically operated means for actuating said switch mechanism; means for controlling the actuation of said switch actuating means comprising a control circuit, a photo electric cell in said circuit mounted at one side of said conveyor adjacent said switch mechanism, a light source mounted at the opposite side of said conveyor for directing a beam of light at said photo cell immediately above said carriers and across the path of movement of articles on said carriers to open said circuit, a pair of breaker points adapted when actuated to interrupt the control circuit of said photo cell, and cam means operable in timed relation with the movement of said conveyor to actuate said breaker points to open the control circuit while the blade on one of said carriers is passing through said switch mechanism, said control circuit being arranged so that, when an article interrupts said beam and said breaker points are closed, said control circuit will be energized to actuate said switch actuating means.

6. In an article sorting mechanism, a conveyor, a plurality of article carriers mounted on said conveyor for lateral movement with respect thereto, and each carrier having a downwardly directed blade guide means for retaining said carriers centrally of said conveyor, guide means for guiding said carriers to the left side of said conveyor, guide means for guiding said carriers to the right side of said conveyor, a switching mechanism for selectively engaging said carriers with any one of said guide means, means for actuating said switching mechanism, circuit means for effecting the actuation of said switching means, a first photo electric cell for controlling said circuit means, said photo cell being mounted at one side of said conveyor adjacent the switching mechanism, a light source mounted at the opposite side of said conveyor and directing a beam of light at said photo cell immediately above said carriers across the path of movement of said articles, a second photo cell adapted to interrupt the switch actuating circuit controlled by said first photo cell, a second light source mounted in opposition to said second photo cell at a position wherein the light beam therefrom will be interrupted by the blades on said carriers, the switch actuating circuit being effective to initiate action of the switching mechanism when both of said light beams are broken simultaneously, and a timing means adapted to hold said switching mechanism in its actuated condition for a predetermined time after actuation thereof.

7. In an article sorting mechanism, a conveyor, a plurality of article carriers mounted on said conveyor for lateral movement with respect thereto and each carrier having a downwardly directed blade, guide means for retaining said carriers centrally of said conveyor, guide means for guiding said carriers to the left side of said conveyor, guide means for guiding said carriers to the right side of said conveyor, a switching mechanism for selectively engaging said carriers with any one of said guide means, means for actuating said switching mechanism, circuit means for effecting the actuation of said switching means, a photoelectric cell for controlling said circuit means, said photo cell being mounted at one side of said conveyor adjacent the switching mechanism, a light source mounted at the opposite side of said conveyor and directing a beam of light at said photo cell immediately above said carriers across the path of movement of said articles, a pair of breaker points in series with and adapted to interrupt the switch actuating circuit controlled by said photo cell except when a carrier is approaching said switching mechanism, cam means operable in timed relation with said conveyor to actuate said breaker points to complete the circuit controlled by said photo cell each time the blade on one of said carriers approaches said switching mechanism, and a timing means adapted to hold said switching means in its actuated condition for a predetermined time after actuation thereof.

8. In an article segregating mechanism, a conveyor; a plurality of article carriers mounted on said conveyor for lateral movement with respect thereto; guide means for retaining said carriers centrally of said conveyor; guide means for guiding said carriers to the left side of said conveyor; guide means for guiding said carriers to the right side of said conveyor; and a switching mechanism for selectively engaging said carriers with any one of said guide means; said switching mechanism comprising a pair of swinging gates; a throw bar connected to said gates; a pair of solenoids for effecting lateral movement of said throw bar; a centering latch mechanism for preventing hunting of said gates when said solenoids are deenergized; said latch mechanism comprising a pair of latch fingers, each of said latch fingers being adapted to prevent movement of said throw bar in one direction from its center position, and a second pair of solenoids for releasing said latch fingers, each of said latch releasing solenoids being wired in parallel with one of said throw bar actuating solenoids.

9. In an article segregating mechanism, a swinging gate switching mechanism comprising a throw bar connected to said gate mechanism, a pair of solenoids selectively operable to effect movement of said throw bar from its center position in either direction lateral to the direction of flow of said articles, a pair of latch fingers each adapted to engage said throw bar and prevent movement thereof in one direction from its center position, and a second pair of solenoids each connected to and adapted to release one of said latch fingers, each of said second solenoids being wired in parallel with one of said throw bar actuating solenoids.

10. In an article sorting mechanism; a conveyor; a plurality of article carriers mounted on said conveyor for lateral movement with respect thereto; guide means for retaining said carriers centrally of said conveyor; guide means for guiding said carriers to the left side of said conveyor; guide means for guiding said carriers to the right side of said conveyor; a switch mechanism for selectively engaging said carriers with any one of said guide means; electrically operated means for actuating said switch mechanism; means for controlling the actuation of said switch actuating means comprising a control circuit, a first photo electric cell connected in said circuit and mounted at one side of said conveyor adjacent said switch mechanism, a light source mounted at the opposite side of said conveyor for directing a beam of light at said photo cell immediately above said carriers and across the path of movement of said articles to impinge on said first photo cell to open said circuit, a second photo cell adapted to interrupt the switch actuating circuit of said first photo cell, a second light source mounted in opposition to said second photo cell at a position wherein the light beam from said second light source will be interrupted by said carriers, said second photo cell being associated with said circuit in such a manner that the interruption of the beam to the cell will cause energizing of the control circuit and impingement of the beam on the cell will open said circuit, said control circuit being effective to initiate action of said switch mechanism when both of said light beams are broken simultaneously.

*11. Sorting mechanism for gently sorting articles received at random spacing from a delivery conveyor, said sorting mechanism comprising endless article conveying means, laterally extending rods carried by said conveying means, means for driving said conveying means, a plurality of article carriers slidably mounted on said rods in longitudinally, uniformly spaced positions, the longitudinal spacing of said carriers relative to the longitudinally dimension of the articles being such that a plurality of carriers are required to support a single article, stationary guide rails for guiding said carriers from a central lead-in path leading from the delivery conveyor, along one of a plurality of divergent sorting paths extending along said conveying means, guide rail engaging means depending from each carrier, carrier shiftable diverter means engageable by said carrier guide rail engaging means for selectively and progressively directing a predetermined number of said carriers from said lead-in path to one of said shorting paths, said carriers having smooth article supporting surfaces with lateral dimensions that substantially exceed their longitudinal dimensions, groups of said carriers in any one sorting path cooperating to provide a planar article supporting surface, article sensing means upstream from said carrier diverter means, a carrier diverter means actuator for said carrier diverter means, control means responsive to said article sensing means for controlling said actuator, said control means including time delay means for causing diversion of a plurality of carriers along the same path in response to a diversion signal from said article sensing means, lateral motion of said carriers as they are diverted laterally of said lead-in path to a sorting path causing said carriers to progressively partially slip on the article and partially shift the article laterally to provide a gentle turning and lateral translation of the article.*

*12. The sorting mechanism of claim 11, wherein there are three sets of said guide rails, a central set, and a set at each side of the mechanism, said side sets each leading from said diverter means in a smooth, ogee curve.*

References Cited by the Examiner

The following references, cited by the Examiner, are of record in the patented file of this patent or the original patent.

UNITED STATES PATENTS

| | | | |
|---|---|---|---|
| 1,868,894 | 7/32 | Glahn. | |
| 2,020,925 | 11/35 | Young | 209—111.5 |
| 2,169,897 | 8/39 | Lueckel. | |
| 2,493,942 | 1/50 | Bingham | 198—31.1 |
| 2,568,255 | 9/51 | Schieser et al. | 209—121 |
| 2,821,302 | 1/58 | Fowler | 209—74 X |

ROBERT B. REEVES, *Acting Primary Examiner.*

ROBERT C. RIORDON, ERNEST A. FALLER, JR., SAMUEL F. COLEMAN, *Examiners.*